United States Patent
Foschini et al.

(10) Patent No.: US 12,128,993 B2
(45) Date of Patent: Oct. 29, 2024

(54) BOAT CHAIR COVER

(71) Applicant: Skipper Seat LLC., Cleveland, NC (US)

(72) Inventors: Stephanie Foschini, Cleveland, NC (US); Christopher Foschini, Cleveland, NC (US)

(73) Assignee: Skipper Seat LLC., Cleveland, OH (US)

( * ) Notice: Subject to any disclaimer, the term of this patent is extended or adjusted under 35 U.S.C. 154(b) by 172 days.

(21) Appl. No.: 17/697,006

(22) Filed: Mar. 17, 2022

(65) Prior Publication Data

US 2022/0297804 A1 Sep. 22, 2022

Related U.S. Application Data

(60) Provisional application No. 63/162,772, filed on Mar. 18, 2021.

(51) Int. Cl.
*B63B 29/04* (2006.01)
*B60N 2/60* (2006.01)

(52) U.S. Cl.
CPC ............. *B63B 29/04* (2013.01); *B60N 2/60* (2013.01); *B63B 2029/043* (2013.01)

(58) Field of Classification Search
CPC .... B63B 2029/043; B60N 2/60; B60N 2/6063
See application file for complete search history.

(56) References Cited

U.S. PATENT DOCUMENTS

| | | | | |
|---|---|---|---|---|
| 1,946,825 A | * | 2/1934 | Wittcoff .................. | B60N 2/60 297/223 |
| 3,479,085 A | * | 11/1969 | Weinstein ................ | B60N 2/60 297/228.1 |
| 4,669,779 A | * | 6/1987 | Kaganas .................. | B60N 2/60 297/229 |
| 4,676,549 A | * | 6/1987 | English .................. | B60N 2/6027 297/229 |
| 4,693,511 A | * | 9/1987 | Seltzer ................. | B60N 2/6054 297/228.11 |
| 5,234,252 A | * | 8/1993 | Wallach ............... | B60N 2/6036 297/229 |
| 5,265,933 A | * | 11/1993 | Croshaw ................ | A47C 31/11 297/229 |
| 5,308,139 A | * | 5/1994 | Rieger ................. | B60N 2/6009 297/229 |
| 5,613,730 A | * | 3/1997 | Buie ........................ | B60N 2/60 297/180.12 |
| 5,709,431 A | * | 1/1998 | Horn .................... | B60N 2/6063 297/229 |

(Continued)

FOREIGN PATENT DOCUMENTS

WO    2018146653 A1    8/2018

*Primary Examiner* — Timothy J Brindley
(74) *Attorney, Agent, or Firm* — Edell, Shapiro & Finnan, LLC (57) ABSTRACT

A boat chair cover comprises longitudinally successive seat and backrest cover sections of towel-like material having respective compartments that are expandable to receive and resiliently engage a cushioned seat and cushioned backrests, respectively, of the boat chair. Mutually engageable strap segments extend transversely from opposite longitudinal edges of the cover for securing the cover about the backrest of the chair.

18 Claims, 5 Drawing Sheets

(56) References Cited

U.S. PATENT DOCUMENTS

| | | | |
|---|---|---|---|
| 5,806,925 A * | 9/1998 | Hanley | B60N 2/60 |
| | | | 297/229 |
| 6,345,866 B1 | 2/2002 | Jackson et al. | |
| 6,626,491 B1 | 9/2003 | Blome et al. | |
| 6,951,367 B1 * | 10/2005 | Dinnan | B60N 2/60 |
| | | | 297/229 |
| 7,000,984 B1 | 2/2006 | Ward | |
| 7,172,246 B1 | 2/2007 | Itakura | |
| 7,419,213 B2 | 9/2008 | Itakura | |
| 7,686,392 B2 | 3/2010 | Kenny | |
| 8,584,278 B2 | 11/2013 | Ross | |
| 8,770,662 B2 * | 7/2014 | Mount | B60N 2/5825 |
| | | | 297/228.1 |
| 9,072,393 B2 | 7/2015 | Friedman et al. | |
| 9,629,464 B2 | 4/2017 | Longshore | |
| 9,867,409 B1 | 1/2018 | Mróz | |
| 9,877,592 B2 | 1/2018 | Farris | |
| D827,336 S * | 9/2018 | Larsen | D6/611 |
| 10,117,522 B2 | 11/2018 | Farris, II | |
| 2007/0170757 A1 * | 7/2007 | Lanham | B60N 2/60 |
| | | | 297/229 |
| 2017/0190272 A1 * | 7/2017 | Gellis | B60N 2/6063 |
| 2017/0253159 A1 * | 9/2017 | Lopatin | B60R 7/005 |
| 2017/0360214 A1 | 12/2017 | Jensen | |
| 2018/0027987 A1 * | 2/2018 | Calhoun | A47C 7/62 |
| 2018/0304784 A1 * | 10/2018 | Ricks | B60N 2/6063 |
| 2019/0389347 A1 | 12/2019 | Francescatto | |
| 2020/0039402 A1 | 2/2020 | Barker | |
| 2020/0094717 A1 * | 3/2020 | Francois | B60N 2/6045 |
| 2020/0223336 A1 * | 7/2020 | Conti | B60N 2/6018 |
| 2020/0359851 A1 | 11/2020 | Lucero, III | |
| 2021/0007492 A1 | 1/2021 | Lalji | |
| 2022/0242288 A1 * | 8/2022 | Po-Jung | B60N 2/60 |

* cited by examiner

BOAT CHAIR COVER

CROSS REFERENCE TO RELATED APPLICATIONS

This application is a non-provisional application claiming priority from U.S. Provisional Application No. 63/162,772, entitled "Vehicle Seat Cover", and filed Mar. 18, 2021, the disclosure in which is incorporated in its entirety herein by this reference.

TECHNICAL FIELD

The disclosure relates generally to covers for vehicle seats/chairs and, in particular, to covers for boat pilot chairs of the type having a backrest portion and a seat portion supported above the boat deck only by a pedestal or post secured to the substantial center of the bottom of the seat portion.

BACKGROUND OF THE DISCLOSURE

Watercraft/boats typically include one or more seats for use by occupants of the vessel. One particular type of such boat seat is a pilot's chair typically comprised of a cushioned lower seat portion and a cushioned upper backrest portion that are covered with vinyl which, when directly exposed to sun, becomes hot and uncomfortable to sit in. In addition, exposure to salt air and moisture can make the vinyl material tacky, prohibiting free movement by the occupant along the seat surface. Apart from these problems, wet skin or clothing tends to be slippery against the vinyl material of the chair, thereby causing potential danger to the chair occupant if the boat speed or orientation changes suddenly.

There are commercially available boat chair covers, most of which are expensive because they must be custom ordered or custom fitted to each boat chair due to significant variations in the thickness and shape of the cushioned seat and backrest of boat chairs. More specifically, the cushioned seat and backrest portions of the various commercially available boat chairs can be as thin as three inches or as thick as eight inches or more. In addition, commercially available covers have no alternative uses because they are intended to be kept on the chairs at all times and have limited fabric design appeal. The few non-custom boat chair seat covers that exist are not configured to securely engage most boat chairs, with the result that the sections covering the backrest or seat portion of the chair, or both, are easily inadvertently moved from their intended cover positions by wind or movement of a seat occupant.

It is desirable, therefore, to provide a relatively inexpensive boat chair cover that can fit and securely engage a significant variety of boat chair sizes and configurations, that can be used for alternative functions (e.g., as a towel, to secure valuables, etc.), that can be compactly stored when not in use, and that can be provided in a wide variety of fabric designs.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a boat chair cover having longitudinally successive seat and backrest cover sections of towel-like material backed having respective compartments that are configured to receive and resiliently engage a cushioned seat and cushioned backrest, respectively, of the boat chair. A strap secures the boat chair cover about the lower part of the boat chair backrest.

More specifically, a boat chair cover disclosed herein comprises seat and backrest cover sections, made of terry-cloth or other towel-like material, that are joined by stitching along a transversely extending seam constituting the bottom edge of the backrest section and the rearward edge of the seat section. An upper receptacle or compartment is provided on the back or underside of the backrest cover section by a first piece of towel-like material stitched to and configured to generally match the contour of the upper part of the backrest cover section. The upper compartment is configured to fit over and receive and resiliently engage the top part of the backrest of a pilot's chair. A lower receptacle or compartment is provided on the back or underside of the seat cover section by a piece of spandex or other expandable fabric stitched to and configured to match the contour of the forward end part of the seat cover section. The lower compartment is configured to fit over and resiliently receive and engage the forward part of the seat portion of a pilot's chair. Selectively engageable strap segments are secured proximate to and extend from respective ends of the transverse seam and may be engaged behind the lower end of the chair seatback to secure the chair cover in place. Small pockets for containing personal items of a user may be provided on the chair cover, either at the upper compartment or at one or both sides of the seat cover section. When not in use the chair cover may be folded or rolled from one end toward the other end, then inserted into the receptacle/compartment at the other end, and thereafter rolled up into a compact configuration for storage.

Advantages of the boat chair cover include its ability to: fit and securely engage and cover boat chairs of a wide variety of configurations and sizes; function as a towel; and be rolled up in a secure and compact configuration for storage.

BRIEF DESCRIPTION OF THE DRAWINGS

By way of example, a specific embodiment of the disclosed device will now be described, with reference to the accompanying drawings, in which.

DETAILED DESCRIPTION OF THE DRAWINGS

The present embodiments will now be described more fully hereinafter with reference to the accompanying drawings, in which several exemplary embodiments are shown. It will be readily understood that the components of the embodiments as generally described herein and illustrated in the appended drawings could be arranged and designed in a wide variety of different configurations. Thus, the following more detailed description of various embodiments, as represented in the drawings, is not intended to limit the scope of the present disclosure, but is merely representative of various embodiments. While the various aspects of the embodiments are presented in drawings, the drawings are not necessarily drawn to scale unless specifically indicated.

The disclosed concepts may be embodied in other specific forms without departing from its spirit or essential characteristics, and the described embodiments are to be considered in all respects only as illustrative and not restrictive. The scope of the invention is, therefore, indicated by the appended claims rather than by this detailed description. All changes embraced within the meaning and range of equivalency of the claims are to be embraced within their scope.

Reference throughout this specification to features, advantages, or similar language does not imply that all of the features and advantages that may be realized with the disclosed embodiments should be or are in any single embodiment of the invention. Rather, language referring to features and advantages is understood to mean that a specific feature, advantage, or characteristic described in connection with an embodiment is included in at least one embodiment of the present disclosure.

As used herein, an element recited in the singular and proceeded with the word "a" or "an" should be understood as not excluding plural elements unless such exclusion is explicitly recited. Furthermore, references to "one embodiment" of the present disclosure are not intended to be interpreted as excluding the existence of additional embodiments that also incorporate the recited features.

As used herein the terms "front" and "forward" refer to the horizontal direction an occupant of a chair is facing when seated in the chair, the terms "rear" and "rearward" refer to the opposite horizontal direction the occupant is facing, and the terms "top", "upward" and "upper" refer to the normally upwardly-facing end or edge of the seatback of the chair, and the term "lower" refers to the compartment at the forward end of the chair cover. The term "transverse" as used herein refers to the horizontal direction perpendicular to forward.

Referring more specifically to the accompanying drawings, there is shown a boat chair cover unit comprising an elongate sheet 10 of fabric such as, preferably, washable terrycloth or other material that is suitable to use as a towel. The length of sheet 10 is roughly equivalent to the total length of the exposed surfaces of the backrest and seat portions of a captain's chair to be covered. Sheet 10 in the disclosed embodiment comprises a backrest cover section 11 and a seat cover section 12 stitched together at a seam 13 joining the lower linear edge of backrest cover section to the rearward linear edge of seat cover section 12. Linear seam 13 thusly extends transversely across sheet 10. It is to be understood that although sheet 10 in the illustrated embodiment is made from two separate sections, it is within the scope of this disclosure that sheet 10 comprises a single piece of material, thereby eliminating seam 13.

The portion of the periphery of backrest section 11 upward of seam 13 is configured to generally match the contour of a typical boat seat backrest portion, such that two parallel longitudinally extending side edges 14, 15 terminate at rounded or arcuate corners at opposite ends of an upper end edge 16. The portion of the periphery of seat section 12 forward of seam 13 is configured to generally match the contour of a typical seat portion of a boat seat, such that two slightly diverging longitudinal side edges 17, 18 terminate at rounded or arcuate corners at opposite ends of a forward edge 19.

A piece of towel-like fabric 21, for example terrycloth, has a peripheral contour at its upper end and sides that matches the contour of the upper end of the backrest cover section 11. The corresponding similar outer edges of piece 21 and backrest cover section 11 are stitched together at aligned common edges to form a closed arcuate end of an upper compartment between section 11 and piece 21. The downwardly facing edge 22 of piece 21 is elastic to render the open end of the upper compartment sufficiently expandable to be stretched over the top portion of the backrest of a boat chair. The upper compartment is configured to receive the top portion of the backrest of a boat chair, and elastic edge 22 assures that the backrest is positively resiliently engaged in the top compartment.

A second piece of expandable fabric 23, for example spandex, has a peripheral contour at its forward end and sides that matches the contour of the forward end of the seat cover section 12. The corresponding similar outer edges of piece 23 and seat cover section 12 are stitched together along common aligned edges to form a closed arcuate end of an expandable lower compartment. The remaining rearwardly facing edge 25 of piece 23 is generally arcuate and defines an expandable open end of the lower compartment extending substantially transversely across sheet 10. The lower compartment is configured to resiliently receive and engage the forward end of the seat portion of a boat chair.

A pair of mutually engageable strap segments 31, 32 are stitched to and extend from respective long sides of sheet 10, typically proximate seam 13, and are configured to be engageable to one another to secure the sheet to the boat chair around the lower part of the chair backrest portion. It will be appreciated that a one-piece strap, rather than two trap sections, may be used for this purpose.

Figure 1:
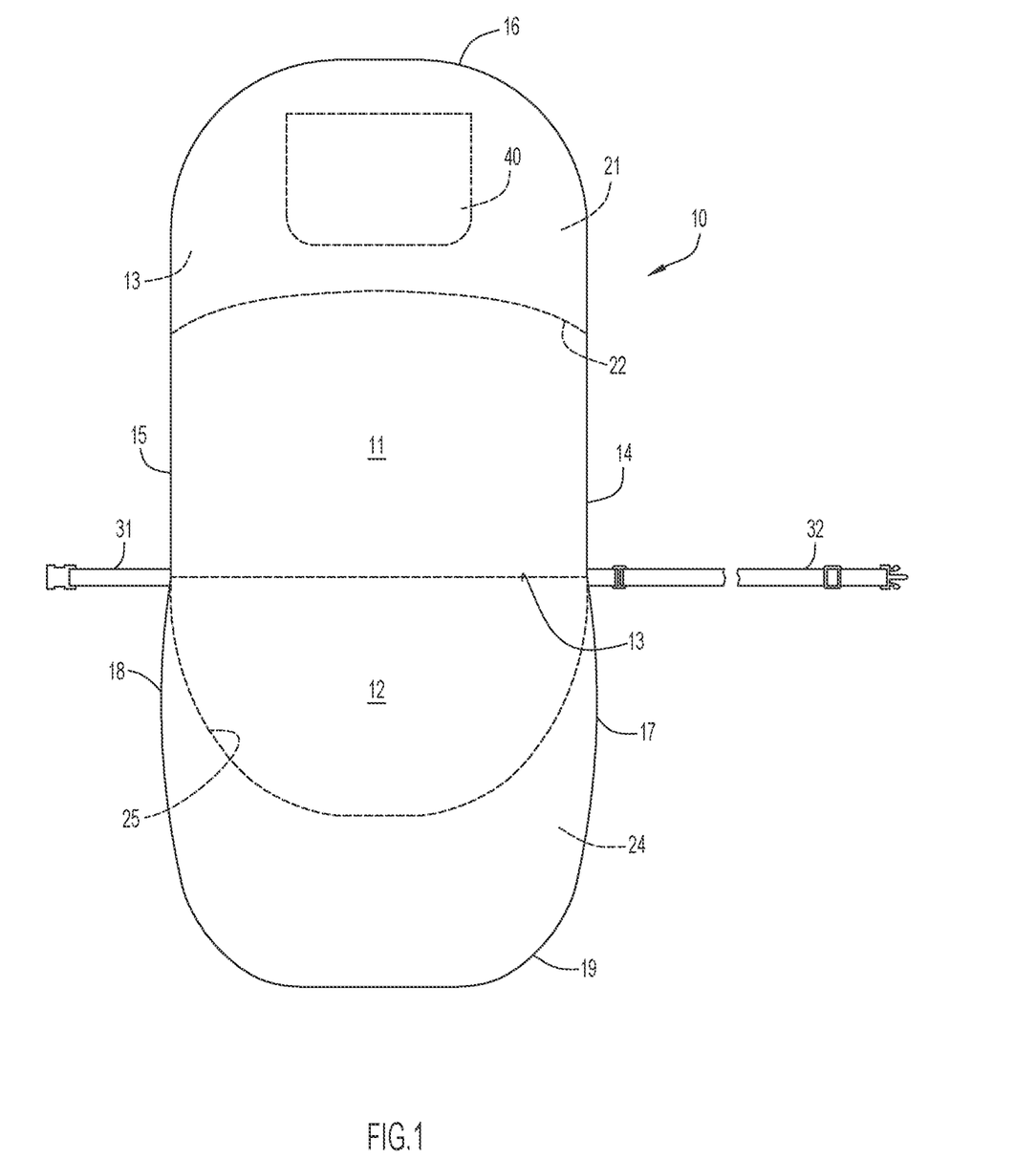
FIG. 1 is a plan view of the front of a chair cover disclosed herein.
Figure 2:
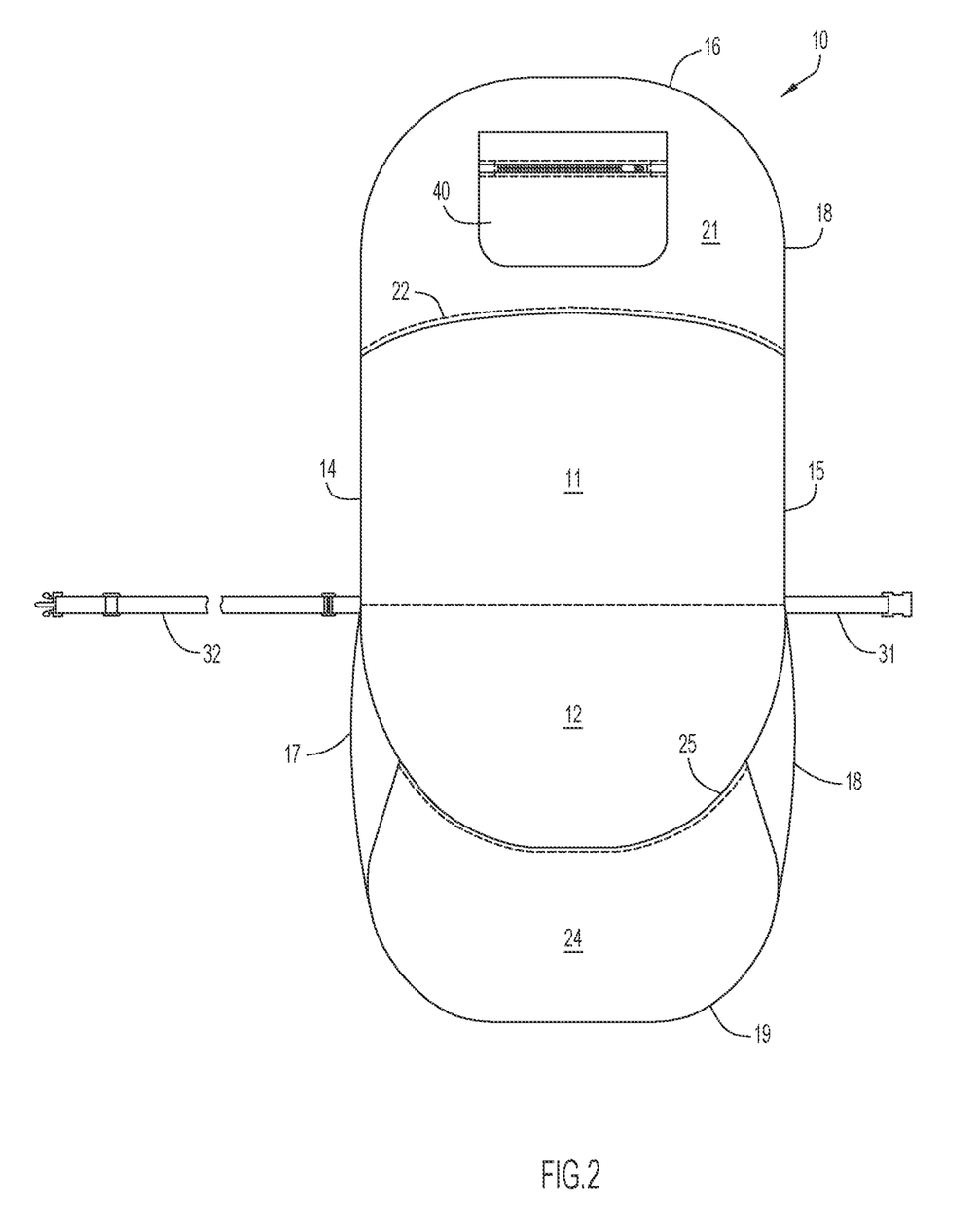
FIG. 2 is a plan view of the back of the cover.
Figure 3:
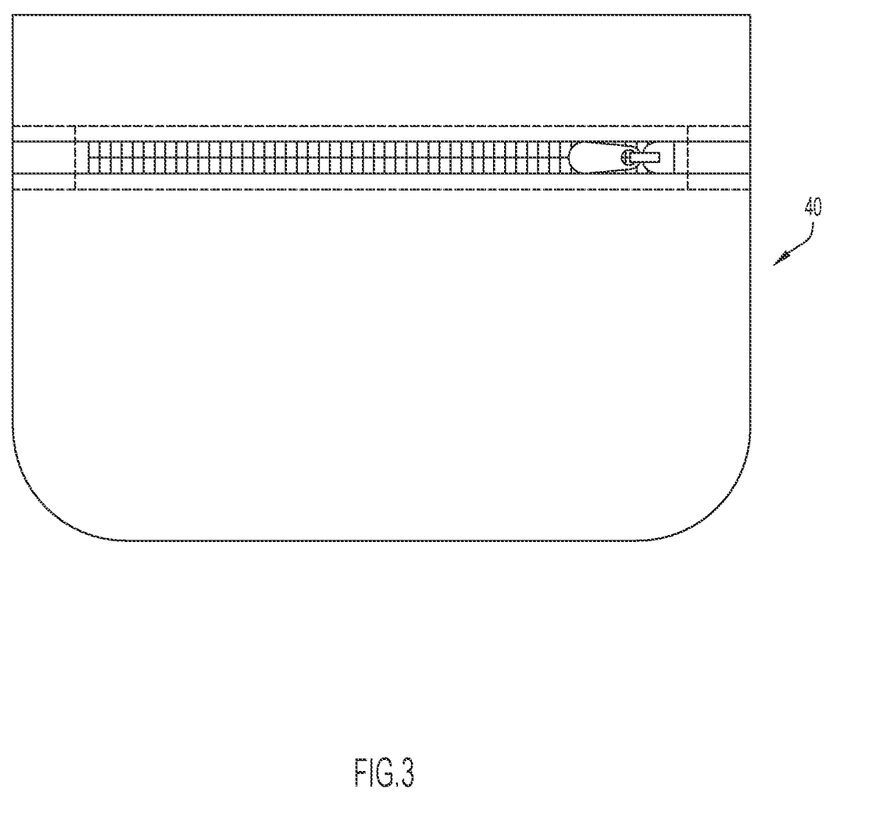
FIG. 3 is a detail plan view of a storage pocket provided on the back of the chair cover.
Figure 4:
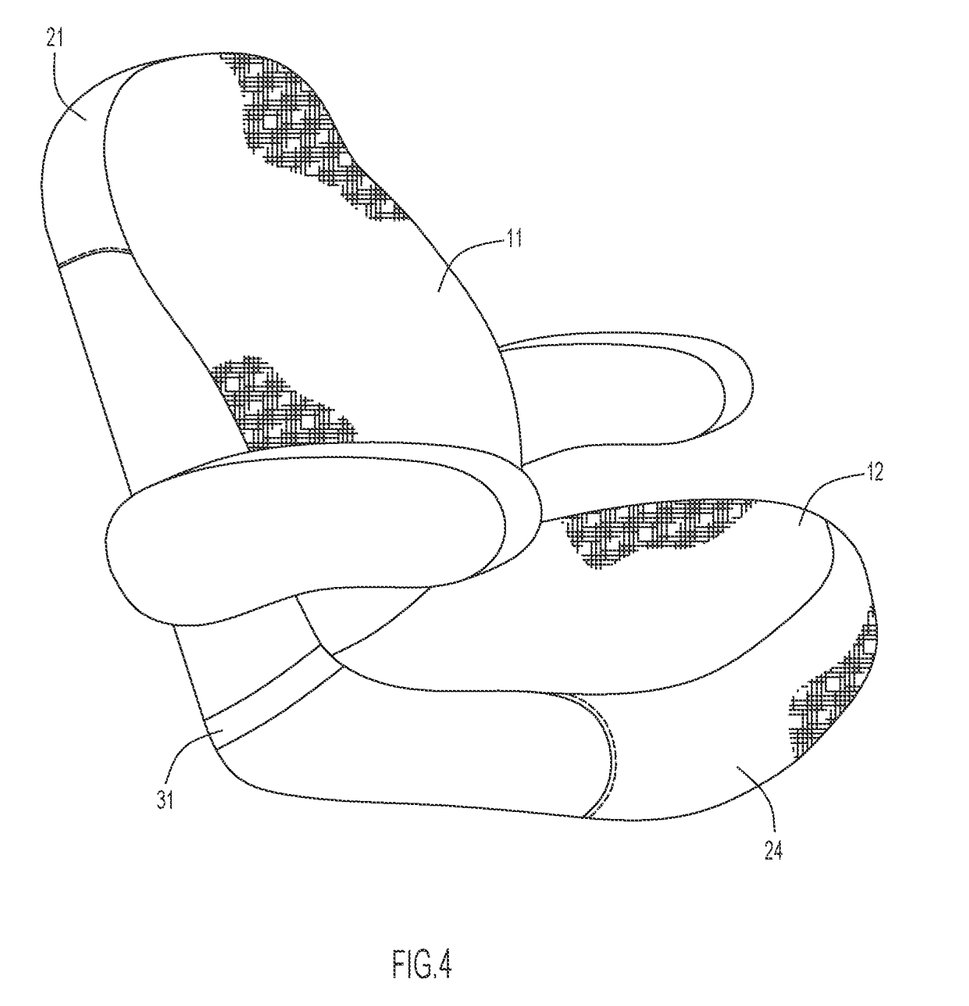
FIG. 4 is a perspective view of the chair cover deployed on a chair.

A storage pocket 40 may be provided on the seat cover unit to safely contain personal items, such as phone, keys, a wallet, etc., of a user. In the illustrated embodiment the storage pocket is shown on the expandable fabric piece 20 but a pocket may be provided on seat cover section 12 at a location proximate edge 17. It will be understood that more than one such pocket may be provided, and that the pocket(s) may be placed at various other locations on the cover unit 10. The pocket may be a separate zippered and waterproof pouch of, for example, a polyester nylon blend material that is sewn onto or otherwise attached to the towel-like material.

Figure 5:
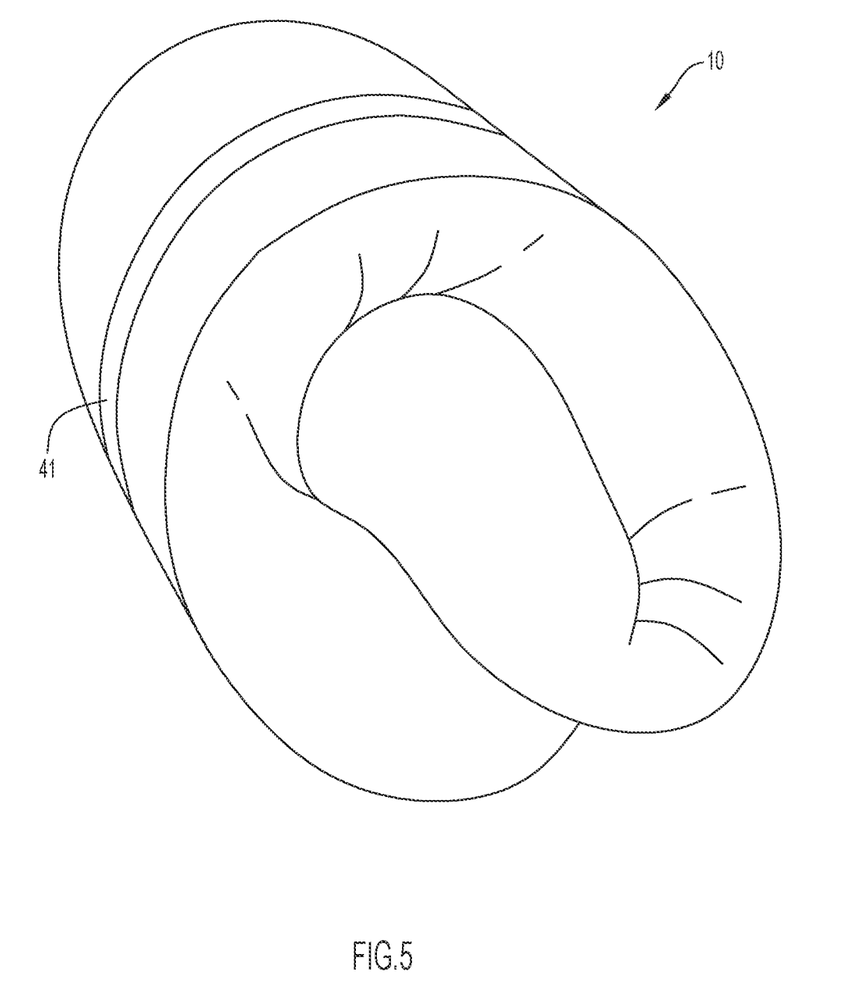
FIG. 5 is a perspective view of the cover rolled up in a storage configuration.

When the boat chair cover unit is not being used as a cover it can be folded into a compact storage configuration, as illustrated in FIG. 5, by folding or rolling it from either end (e.g., upper edge 16) toward the opposite end (e.g., lower edge 19) until reaching the opening of the opposite compartment (e.g., the lower compartment). The roll may then be inserted into the lower compartment which can then be rolled closed (e.g., in burrito-like fashion) in the compact storage configuration. A plastic band 41, rubber band, strap or similar means may be used to surround the compact unit to prevent it from unrolling when stored. When in its storage configuration the unit can be used as a head pillow. In addition, it will be appreciated that the unit, when not in its storage configuration or deployed on a boat chair, may be used as a towel.

In order to provide perspective regarding size and configuration a the disclosed embodiment, and not to serve as limiting the scope of the invention recited in the claims, the following dimensions and features of the chair cover unit were used in one example of the disclosed embodiment that functions as described a variety of captain's seats:

Seatback cover section 11: Terrycloth material; 2', 6⅞" length; 2,' ¾" transverse width.

Seat section 12: Heavyweight terrycloth material; 12: 2', 5/16" in length; 2',8½" in transverse width.

Piece 21: Terrycloth material; 1", 4 9/16" in length; 2', 1 7/16" in transverse width.

Piece 24: Spandex material; 1', 3 3/16" in length; 2' in transverse width.

Strap segment 31: Nylon material; 1" wide; 6" long, with buckle.

Strap segment 32: Nylon material; 1" wide; 24" long.

The chair cover unit is designed to fit a wide variety of boat captain chairs and to remain securely in place once deployed. Specifically, the elasticity of compartments 21 and 25 permits positive grasping of the chair at both the top of a chair seatback back and the protruding forward end of the chair seat, respectively, and the strap retains the mid-portion of the unit in place. Being made of terrycloth or other towel material permits the cover to be used as a towel when not deployed on a chair. The pocket 40 provides the additional function of storing valuables and protecting them from the elements.

In the illustrated and preferred embodiment, piece 24 forming the lower compartment is made from expandable material, e.g. spandex, and piece 21 forming the upper compartment is made of terrycloth but includes an elastic opening edge to render the upper compartment expandable. It is to be understood that, in some embodiments, piece 21 may also be made of spandex; or both pieces 21 and 24 may be made of terrycloth and elastic opening edges to render the compartment expandable.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

The present disclosure relates to an improved boat chair cover that eliminates the problems of prior chair and seat covers that are described herein.

As used herein, an element or operation recited in the singular and proceeded with the word "a" or "an" should be understood as not excluding plural elements or operations, unless such exclusion is explicitly recited. Furthermore, references to "one embodiment" of the present disclosure are not intended to be interpreted as excluding the existence of additional embodiments that also incorporate the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A cover for a boat chair having a cushioned seat portion and a cushioned backrest portion, said cover comprising:
    an elongated towel composed of a first material and having a seat cover section and a backrest cover section;
    a first piece of expandable fabric composed of a second material, different from the first material, and secured to and configured to match an upper end of the backrest cover section to define a first compartment configured to resiliently receive and engage an upper end of the cushioned backrest portion of the boat chair;
    a second piece of expandable fabric composed of a third material, different from the first material, and secured to and configured to match a forward end of the seat cover section to define a second compartment configured to resiliently receive and engage a forwardly extending end of the cushioned seat portion of the boat chair; and
    strap segments extending from respective long sides of said elongated towel and configured to be engageable to one another to secure said elongated towel to the boat chair, wherein the strap segments are positioned between the first piece of expandable fabric and the second piece of expandable fabric to extend around the cushioned backrest portion of the boat chair.

2. The cover of claim 1 wherein the seat cover section and backrest cover section are two pieces of the first material joined by stitching along a transversely extending seam constituting a bottom edge of the backrest cover section and a rearward edge of the seat cover section.

3. The cover of claim 2 wherein the strap segments are secured to said elongated towel at said transversely extending seam.

4. The cover of claim 1 wherein said second compartment is sufficiently expandable to resiliently receive and engage the forwardly extending end of the cushioned seat portion having a thickness of at least seven inches.

5. The cover of claim 1 further comprising at least one pocket coupled to the first piece of expendable fabric.

6. The cover of claim 1 wherein said first compartment is sufficiently expandable to resiliently receive and engage the upper end of the cushioned backrest portion having a thickness of at least four inches.

7. The cover of claim 1 wherein at least one of said first compartment or said second compartment is sufficiently large and resilient to receive said elongated towel rolled up for storage.

8. The cover of claim 1,
    wherein the first compartment comprises a downward facing expandable opening extending substantially transversely of said elongated towel, and a closed upper peripheral edge extending generally arcuately between opposite ends of said downward facing expandable opening and formed by a stitched seam joining the first piece of expandable fabric to the upper end of the backrest cover section; and wherein the second compartment comprises a rearward facing expandable opening extending substantially transversely of the elongated towel, and a closed forward peripheral edge extending generally arcuately between opposite ends of said rearward facing expandable opening and formed by a stitched seam joining the second piece of expandable fabric to the forward end of the seat cover section.

9. A boat chair cover, for a boat chair having a cushioned seat portion and a cushioned backrest portion, the boat chair cover comprising:
   a longitudinally successive seat cover section and backrest cover section composed of a first material, the first material being towel-like;
   a first expandable fabric extending from the seat cover section to cooperatively form a first compartment with the seat cover section, wherein the first expandable fabric is configured to receive and resiliently engage the cushioned seat portion of the boat chair, and the first expandable fabric is composed of a second material, different from the first material;
   a second expandable fabric extending from the backrest cover section to cooperatively form a second compartment with the backrest cover section, wherein the second expandable fabric is configured to receive and resiliently engage the cushioned backrest portion of the boat chair, and the second expandable fabric is composed of a third material, different from the first material; and
   mutually engageable strap segments extending transversely from opposite longitudinal edges of the boat chair cover for securing the boat chair cover about the boat chair, wherein the mutually engageable strap segments are configured to extend about the cushioned backrest portion of the boat chair.

10. The cover of claim 1 wherein the second material and the third material comprise the same material.

11. The cover of claim 10 wherein the second material and the third material comprise spandex.

12. The cover of claim 11 wherein the first material comprises terrycloth.

13. The cover of claim 5 wherein the at least one pocket is composed of a fourth material, different from each of the first material, the second material, and the third material, the fourth material is waterproof, and the at least one pocket is attached to an exterior of the first piece of expandable fabric.

14. The cover of claim 13 wherein the fourth material comprises a nylon blend.

15. The cover of claim 1 wherein the first piece of expandable fabric includes a first edge and a second edge, the first edge of the first piece of the expandable fabric is attached to the upper end of the backrest cover section, and the second edge of the first piece of expandable fabric is separate from the backrest cover section to define the first compartment.

16. The cover of claim 15 further comprising a pocket attached to an exterior of the first piece of expandable fabric, wherein the pocket terminates prior to the second edge of the first piece of the expandable fabric.

17. The cover of claim 15 wherein a first length of the first piece of expandable fabric from the first edge to the second edge is less than half of a second length of the elongated towel from the upper end of the backrest cover section to the forward end of the seat cover section.

18. The cover of claim 17 wherein the second piece of expendable fabric includes a third edge and a fourth edge, the third edge of the second piece of expandable fabric is attached to the forward end of the seat cover section, the fourth edge of the second piece of expandable fabric is separate from the seat cover section to define the second compartment, and a third length of the second piece of expendable fabric from the third edge to the fourth edge is equal to the first length of the first piece of expandable fabric from the first edge to the second edge.

* * * * *